United States Patent [19]

Meitl

[11] 3,999,674
[45] Dec. 28, 1976

[54] BALE LOADER AND SHREDDER

[75] Inventor: Harold G. Meitl, Darien, Ill.

[73] Assignee: International Harvester Company, Chicago, Ill.

[22] Filed: Sept. 2, 1975

[21] Appl. No.: 609,751

[52] U.S. Cl. .............................. 214/506; 214/508; 214/518; 214/83.14; 241/101 A; 241/35

[51] Int. Cl.² ......................................... B60P 1/16

[58] Field of Search ............ 214/83.14, 83.26, 518, 214/78, 519, 521, 522; 241/101 A, 35; 239/658

[56] References Cited

UNITED STATES PATENTS

| | | |
|---|---|---|
| 2,772,796 | 12/1956 | Hansen ........................... 214/83.14 |
| 3,666,122 | 5/1972 | Youmans ........................... 214/518 |

FOREIGN PATENTS OR APPLICATIONS

| | | |
|---|---|---|
| 1,179,502 | 1/1970 | United Kingdom ............ 214/83.14 |

Primary Examiner—Albert J. Makay
Attorney, Agent, or Firm—Neal C. Johnson; Floyd B. Harman

[57] ABSTRACT

A machine adapted to be towed by a tractor and powered by the PTO and hydraulic power system of the tractor for loading, transporting, shredding and feeding a module (bale or stack) of hay of substantial size and weight. The machine includes a frame and a load bed thereon. The frame mechanically supported on a pair of ground wheels which are swingable relative to the frame to tilt the load bed rearwardly into ground engagement. A module pickup ramp or fork is pivotally mounted on the load bed for lifting a module onto the load bed. A conveyor on the load bed moves the module forwardly against a plurality of vertically spaced rotary shredders. The shredded hay falls upon an auger conveyor which feeds the hay from the machine into a feed bunk or onto the ground for livestock feeding. The load bed conveyor is hydraulically driven and the shredders are mechnically driven. Control means are operatively connected between the drives for slowing the conveyor feed rate in response to an increase in the load on the shredders.

7 Claims, 8 Drawing Figures

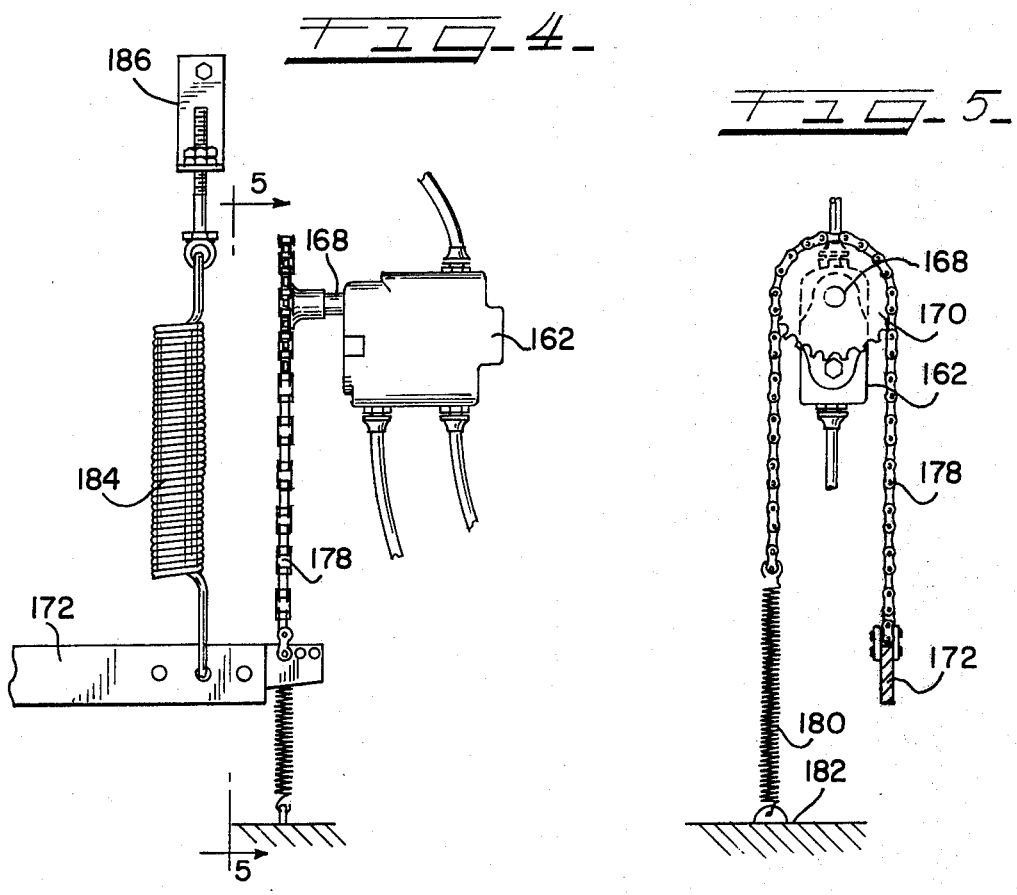
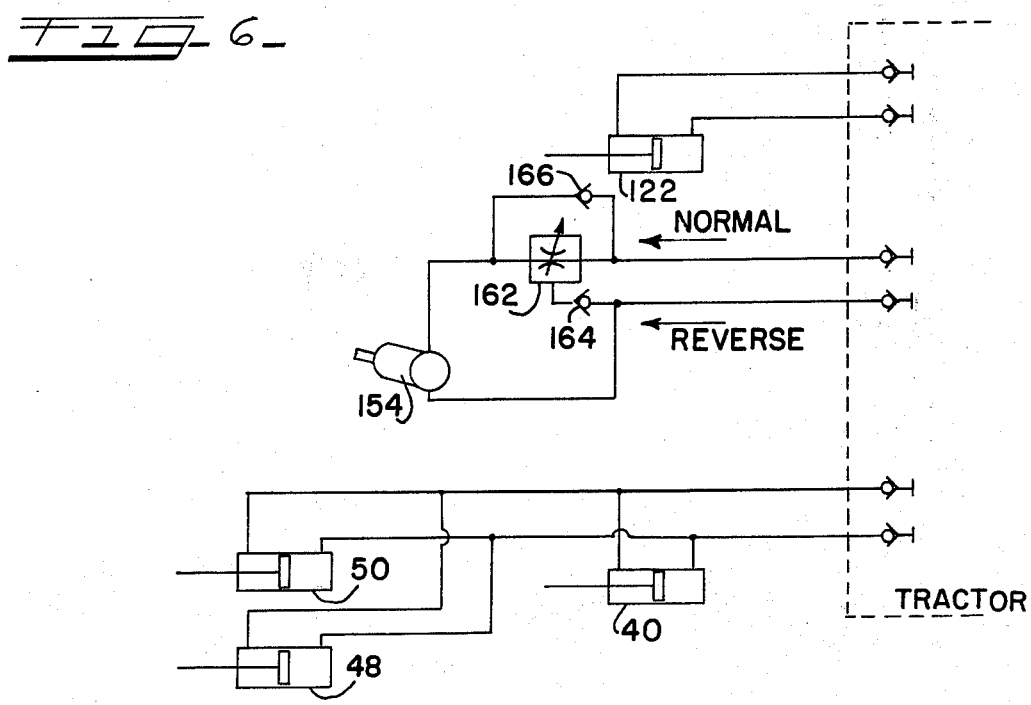

3,999,674

BALE LOADER AND SHREDDER

CROSS REFERENCE TO RELATED APPLICATIONS

Application Ser. No. 568,354 filed Apr. 15, 1975 entitled "Bale Loader and Shredder", Homer N. Grillot, inventor.

BACKGROUND OF THE INVENTION

1. Field of the Invention

The invention relates generally to article handling and shredding and, more particularly, to loading, transporting, shredding and dispensing a module of hay.

2. Prior Art

Machine feeding of bales and stacks of hay is known wherein hay is sliced from a stack or shredded from a stack or bale carried on the machine and discharged in a continuous stream as the machine is moved along a feed bunk or the like. Examples are shown in the following U.S. Pat. Nos.: 3,035,729, 3,530,912, 3,741,051, 3,773,269, 3,830,438 and 3,863,850.

These patents do not define or relate to a specific operational problem involving shredding the hay module, particularly where the module has a density in the upper ranges caused by compression during module formation. The problem is that the shredders cannot shred and remove hay from the module at a uniform rate due to variations in module density, type of hay in the module, moisture content of the hay, and possibly other factors. Moreover, the modules vary in size and shape. And of course, the size and weight of the module is progressively decreased during shredding.

It has been found during actual field testing that moving the module into the shredders at a uniform rate results in unacceptably high ranges of horsepower to the shredders. More specifically, horsepower requirements have surged between twenty and sixty horsepower imposing shock loads on drive components, breaking drive chains, and inducing premature wear. A further consequence is a nonuniform rate of delivery of hay onto the discharge conveyor, increasing the possibility of plugging and ultimately resulting in uneven feeding of hay from the machine.

SUMMARY

The invention provides a machine for loading, transporting, shredding and feeding a module (stack or bale) of hay. In practice the machine is adapted to be towed behind and powered by an agricultural type tractor and includes a lift ramp or fork for lifting the hay module, a load bed upon which the module is carried, a conveyor for moving the module on the load bed, shredder means for progressively shredding material from the module, and discharge means for feeding the shredded material from the machine as it is moved through the feeding area. The invention includes a control means for varying the drive speed of the load bed conveyor in response to variations in the load the module imposes upon the shredder means. Among the beneficial results is a substantial decrease in the horsepower range of the shredders. The above-mentioned range of 20 to 60 horsepower has been reduced in field tests to a range of 5 to 35 horsepower. Reduction to an even lower figure is possible, however the feed rate of the material becomes too low for practical purposes.

It is a primary object of the invention to provide a machine for lifting, transporting, shredding, and feeding a module of hay.

Another object in accordance with the preceding object is to provide an effective machine even where the module is of high density and of substantial size and weight.

Another object is to provide a coordinated feeding rate of material into shredding means to reduce horsepower requirements.

A further object in accordance with the preceding object to reduce the range of horsepower requirements.

A further object is to minimize shock loads on the operating components of the machine.

A still further object is to provide a smooth even flow of material through the various handling, shredding, and feeding steps to provide a uniform rate of discharge of material into the feed bunk or the like.

Another object is to provide a machine of the above character which provides a relatively simple means for lifting a hay module from the ground for further processing.

BRIEF DESCRIPTION OF THE DRAWINGS

FIG. 4 is an enlarged fragmentary elevation of a portion of the control system of FIG. 2;

FIG. 5 is a fragmentary sectional view taken in the directions of arrows 5—5 of FIG. 4;

FIG. 6 is a schematic view of the hydraulic drive system of the machine;

DESCRIPTION OF THE PREFERRED EMBODIMENT

Figure 1:
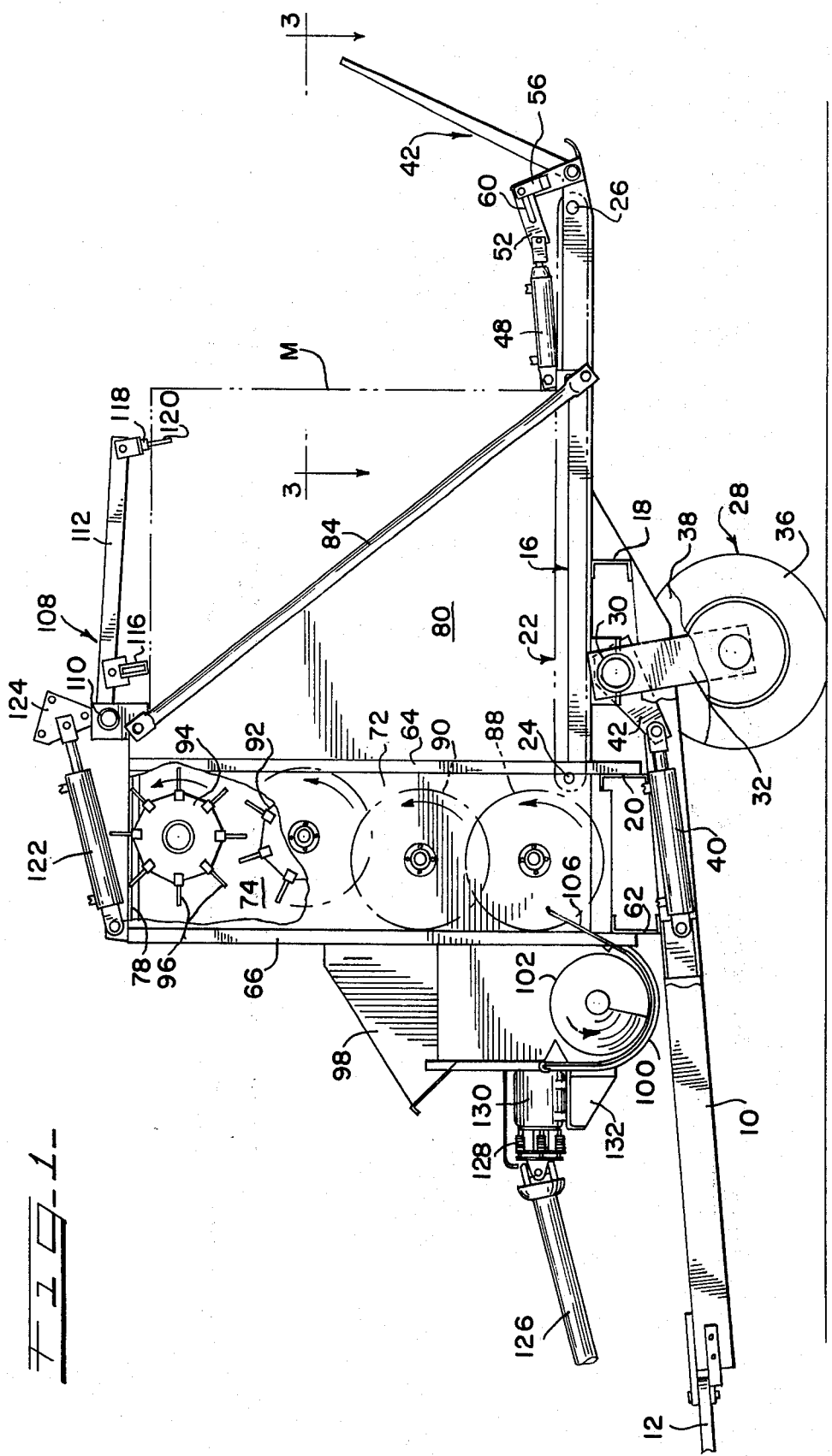
FIG. 1 is a side elevation view of the machine of the invention.

Referring first to FIG. 1 there is shown a machine for loading, transporting, shredding and feeding a stack or bale of hay of substantial size and weight. The machine includes a rearwardly diverging A-frame 10 connectible at its forward end to a drawbar 12 of a towing tractor 14 (shown partially in FIGS. 4 and 5). The tractor 14 is preferably of the agricultural type including a mechanical PTO drive and a source of hydraulic power.

A generally flat and rectangular load bed 16 is rigidly supported on a pair of channel frame members 18 and 20 which are secured transversely on the A-frame 10. The load bed 16 supports an endless conveyor 22 of the chain and-slat type disposed between a driven shaft 24 and an idler shaft 26.

The machine is supported on a wheel assembly 28 which is swingable relative to the frame 10 to move the load bed 16 between a generally horizontal position (FIG. 1) and a rearwardly inclined load-receiving position (FIGS. 4 and 5). The wheel assembly 28 includes a tubular cross-beam 30 journaled from the underside of the load bed 16 and extending across the width of the machine. Legs 32 and 34 are welded to the respective opposite ends of the beam 30. Rubber-tired wheels 36 and 38 are journaled on the lower ends of the legs 32 and 34, respectively. A hydraulic double-acting piston cylinder unit 40 is connected between the frame 10 and an arm 42 welded to the beam 30 for powered shifting of the wheel assembly 28.

Figure 3:
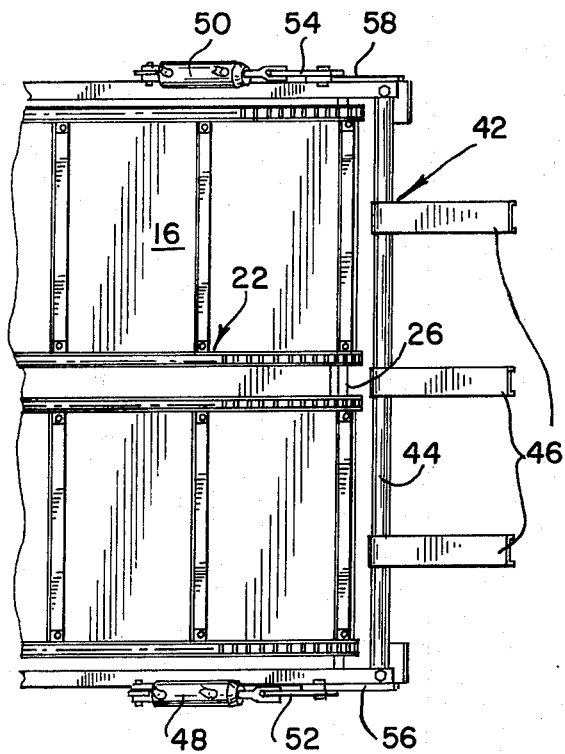
FIG. 3 is a fragmentary plan view of the machine taken in the direction of arrows 3—3 of FIG. 1.

The machine of the invention includes a module-lifting fork or ramp 42 pivotally mounted on the rear of the load bed 16. As best shown in FIG. 3, the fork 42 includes a pivot shaft 44 to which a plurality of rearwardly tapered tines 46 are welded. The lifting fork 42 is movable by means including a pair of hydraulic double-acting piston-cylinder units 48 and 50 mounted on opposite sides of the load bed 16 (FIG. 3). The units 48 and 50 are coupled through respective links 52 and 54 to respective arms 56 and 58 welded to the ends of the pivot shaft 44. Each of the links 52 and 54 is slotted as shown at 60 in FIG. 1 to provide a lost-motion connection with the respective arm 56 and 58.

Referring again to FIGS. 1 and 2 the machine includes a framework for supporting operative components to be described. A channel member 62 is secured across the frame 10. Two pair of vertical channel members 64, 66, 68, and 70 are secured to and extend upwardly from the ends of the channels 20 and 62. The channels 64 and 66 (FIG. 1) support a vertical wall 72 on one side of the machine while the channels 68 and 70 (FIG. 2) support a vertical wall 74 on the opposite side of the machine. To further strengthen and rigidify the framework a right-angle member 76 is secured between the upper ends of the channel 64 and 66 and another right-angle member 78 is likewise secured between the channel 68 and 70. If desired, a pair of generally triangular side sheets 80 and 82 may be secured on opposite sides of the load bed 16 contiguously with the sidewalls 72 and 74. Tubular braces 84 and 86 are connected on opposite sides of the load bed 16 and extend upwardly and forwardly into connection with the right angle members 76 and 78, respectively.

The machine includes a vertical array of power-driven rotary shredders shown at 88, 90, 92, and 94 journaled in the sidewalls 72 and 74 so as to extend across the width of the machine. Each of the shredders includes a cage-like structure having a plurality of circumferentially spaced rows of radially projecting transversely spaced teeth 96. As will be subsequently described in greater detail, the shreddres tear hay from the bale or stack moved thereagainst and move the shredded hay forwardly between adjacent shredders and at times over the topmost shredder. Thus, all of the shredded hay is moved forwardly by the shredders. It will be understood that the front of the machine between the channel members 66 and 70 is open to permit the shredded material to be moved forwardly out of the shredding zone.

Figure 2:
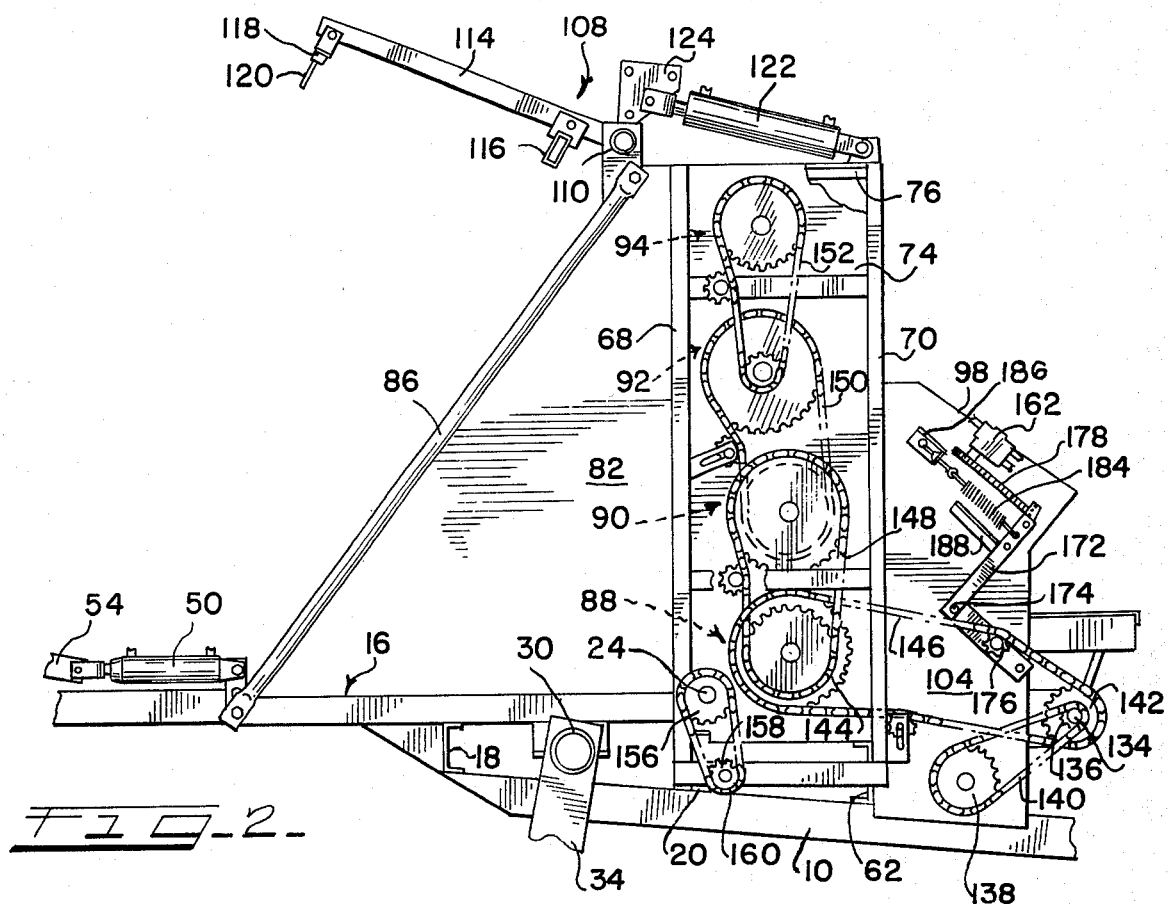
FIG. 2 is a fragmentary side elevation of the opposite side of the machine of FIG. 1.

An open-top hopper 98 is secured across the front of the machine for receiving shredded hay and directing the same downwardly into a contiguous trough 100 within which is journaled a discharge auger 102. The trough 100 extends the full width of the machine between the channel member 66 and 70 and is closed at one end by a wall 104 contiguous with the sidewall 74 (FIG. 2). Of course the opposite end of the trough is open to permit discharge of the material. The auger 102 is journaled in the wall 104 and extends the length of the trough 100. If desired, a U-shaped trough extension 106 (FIG. 1) may be attached to the discharge end of the trough 100 to facilitate discharge of the material.

For purposes to be described the machine includes a module hold-down assembly 108 (FIGS. 1 and 2) swingable between raised and module-engaging positions. The hold-down assembly 108 includes a tubular shaft 110 journaled in suitable supports on the frame members 76 and 78; a pair of laterally-spaced parallel members 112 and 114 secured to the shaft 110; and a pair of laterally extending bars 116 and 118 secured to the members 112 and 114. A plurality of module-engaging teeth 120 are secured to the bar 118 in a laterally spaced array. The assembly 108 is moved between its raised and module-engaging positions by a double-acting piston-cylinder unit 122 pivotally connected between the machine framework and an arm 124 secured to the shaft 110.

In general, power is supplied from the towing tractor mechanically to the shredders and discharge conveyor and hydraulically to the other operating components. More specifically with reference to FIG. 1, the mechanical power train includes PTO shafting 126, a slip clutch 128, and a right-angle gear box 130 supported on a bracket 132 secured to the front of the trough 100. Referring now to FIG. 2 a shaft 134 extends from the gear box 130 to the edge of the machine. The discharge auger 102 (FIG. 1) is driven through a chain and sprocket drive including a sprocket 136 on the shaft 134, a sprocket 138 on the auger 102, and a drive chain 140 trained about the sprockets 138 and 140.

The shredders 88, 90, 92, and 94 are driven from the shaft 134 through a series of four chain and sprocket drives shown in FIG. 2. The first drive includes a sprocket 142 on the shaft 134, a sprocket 144 on the lowermost shredder 88, and a chain 146 trained on the sprockets 142 and 144. The next higher shredder 90 is driven from the shredder 88 by a chain and sprocket drive having a drive chain 148. The shredder 92 is driven from the shredder 90 by a chain and sprocket drive having a chain 150, and the uppermost shredder 94 is driven from the shredder 92 by a chain and sprocket drive having a chain 152. Of course, the various sprockets in these drives are sized to provide the desired speed ratios among the shredders for optimum material shredding.

Figure 8:
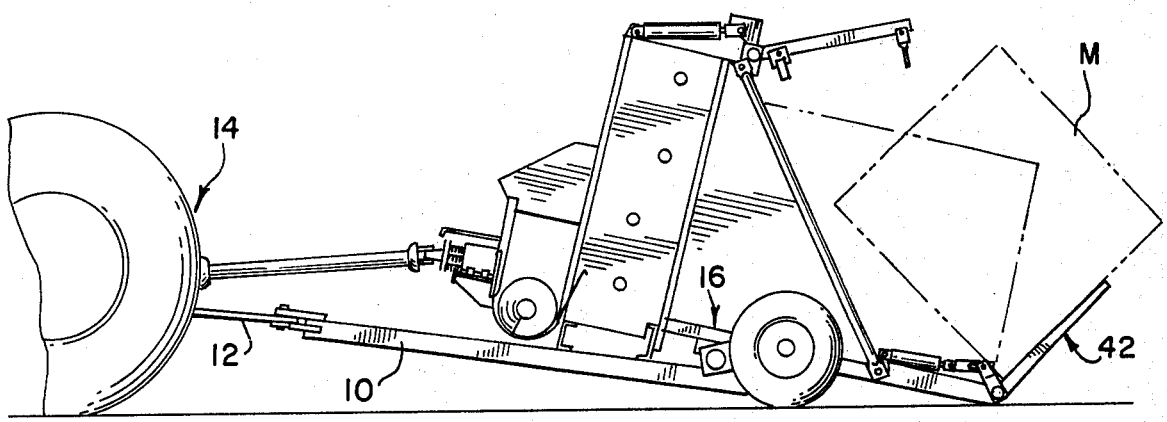

The hydraulically powered system of the machine is shown schematically in FIG. 6. The module lift cylinder units 48 and 50 and the machine-tilt cylinder unit 40 are connected in a circuit so as to be operable by a single control lever (not shown) on the tractor. This particular system is designed for automatic sequential actuation of the module lift units 48 and 50 and then the machine-tilt unit 40 during a module loading operation. That is, the hydraulic units are sized relative to each other and operate through mechanical linkages such that the lifting fork 42 will raise a module (FIG. 8) after which the machine will be raised to its normal horizontal position.

The bed chain conveyor 22 is driven by a rotary hydraulic motor 154 (shown schematically in FIG. 6) through a chain and sprocket drive shown in FIG. 2. A sprocket 156 is secured on the conveyor shaft 24. Another sprocket 158 is secured to the shaft of the motor 154 and a chain 160 is trained about the sprockets.

A feature of the invention is the provision of control means operative in response to load variations on the shredders to vary the drive speed of the conveyor 22. The hydraulic circuit for the motor 154 (FIG. 6) includes a variable flow divider valve 162 for controlling the flow of pressure fluid to the motor to thus vary its speed. During normal driving operation of the motor 154, pressure fluid moves in the direction of the arrows through the flow divider valve 162 to the motor 154, with any excess or "regulated" fluid returning to the tractor through a check valve 164. Reverse operation of the motor 154 bypasses the valve 162 entirely via a check valve 166.

The flow divider valve 162 is mechanically controlled through a system shown in FIGS. 2, 4, and 5. The valve 162 is mounted on the wall 104 of the machine and as best shown in FIGS. 4 and 5 includes a rotatable control shaft 168 by which fluid flow is controlled within the valve. A sprocket 170 is secured on the end of the control shaft 168. A bell crank 172 is pivotally mounted at 174 on the wall 104. A sprocket 176 is journaled on the bell crank 172 and is disposed in running engagement with the upper run of the drive chain 146. As shown in greater detail in FIGS. 4 and 5 a chain 178 is trained about the sprocket 170 with one end being connected to the bell crank 172. The other end of the chain 178 is connected to a spring 180 which is in turn connected to a suitable bracket 182 secured to the machine wall 104. An adjustable-length spring 184 is connected between the bell crank 172 and a bracket 186 mounted on the machine wall 104. An angle member 188 (FIG. 2) is secured to the wall 104 and serves as a position stop for the bell crank 172.

Figure 7:
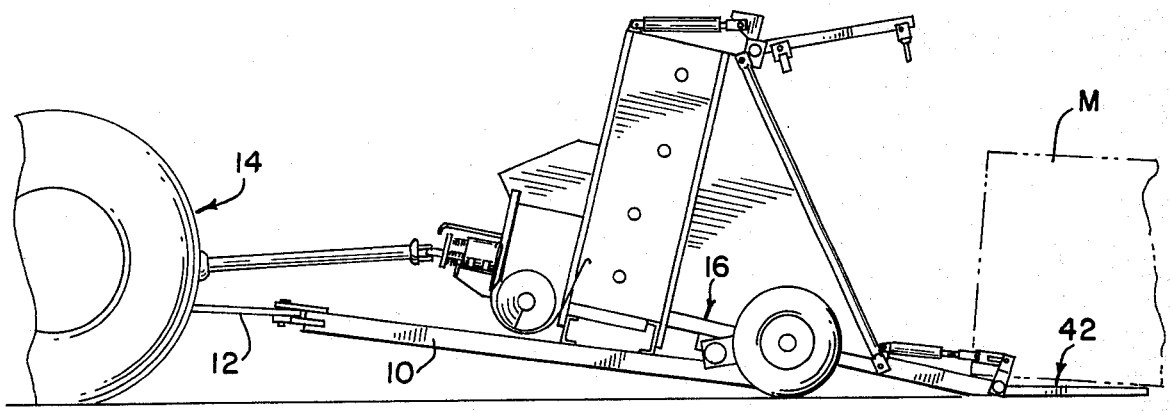
FIG. 7 is a side elevation of the machine behind a tractor and disposed in a module-loading position; and, FIG. 8 is a view similar to FIG. 7 showing the module being loaded from the ground onto the machine.

In operation the hydraulic units 40 and 48 and 50 are extended to lower the machine and the lift fork 42 to the position shown in FIG. 7. The machine is then moved rearwardly to push the lift fork 42 under the module M. When the module M consists of a cylindrical bale, the versatility of the machine permits the bale to be loaded whether resting on a cylindrical side or a flat end. In the former position the bale will be lifted through approximately 90° and deposited end first onto the load bed 16 upon actuation of the lift units 48 and 50. In the latter position the bale can roll forwardly onto the load bed when the lift fork 42 is raised. When the modual M consists of a stack the fork 42 functions similar to a ramp permitting the stack to side over it and onto the conveyor 22 as the machine is moved rearwardly. As above mentioned the machine will be raised by the hydraulic unit 40 to a transport position automatically in response to the raising of the fork 42 to its full up position.

To shred and feed the module the hydraulic motor 154 is actuated to drive the conveyor 22 and move the module M forwardly against the shredders 88 through 94. The mechanical power drive is then actuated to drive the shredders and the discharge auger 102. The teeth 96 of the shredders tear hay from the module and move it forwardly into the hopper 98 and onto the auger 102. As shown by the arrows in FIG. 1 the shredders move upwardly against the front face of the module and can in some instances tend to move the module upwardly. The operator can selectively lower the hold-down assembly 108 onto the top of the module to stabilize it during shredding.

In the case where the load on the shredders increases beyond desired levels, the control means of the invention becomes effective. An increase of torque-loading on the shredders causes the upper run of the drive chain 140 (FIG. 2) to seek a straight line path and in so doing moves the bell crank 172 clockwise about its pivot mount 174 due to the engagement of the sprocket 176 which the chain 140. As best seen in FIG. 5 downward movement of the bell crank 172 rotates the sprocket 170 in a clockwise direction. The flow divider valve 162 thus decreases the flow of hydraulic fluid to the conveyor drive motor 154 and the conveyor 22 is slowed or stopped. As the shredders continue to shred the material from the module the torque load thereon decreases and the spring 184 urges the bell crank 172 back toward the stop member 188. This permits the spring 180 (FIG. 5) to move the chain 178 and thus turn the sprocket 170 in a counterclockwise direction thereby increasing the flow of pressure fluid to the conveyor drive motor 154. By adjusting the effective length of the spring 184, one can optimize the degree of speed control between the conveyor 22 and the shredders. The discharge auger 102 conveys the hay out of the hopper 98 and onto the ground or into a feed bunk as the machine is moved therealong.

What is claimed is:

1. A machine for loading and shredding a module of hay, comprising:
    a mobile frame;
    a load bed mounted on said frame;
    a module-lifting ramp pivotally mounted on an end of said load bed for engaging and lifting a module from the ground onto said load bed;
    a plurality of rotary shredders journalled on said frame for shredding hay from the module;
    a conveyor on said load bed for moving a module toward said shredders for progressive shredding thereby;
    and power drive means for actuating said shredders and driving said conveyor, said power drive means including a control means for varying the drive speed to said conveyor in response to variations in the load imposed on said shredders, said power drive means including a mechanical drive to said shredders and a hydraulic drive to said conveyor, said control means being operatively connected between said mechanical drive and said hydraulic drive.

2. A machine adapted to be towed behind a tractor for loading, transporting and shredding a module of hay, comprising:
    a frame adapted to be coupled to the tractor;
    a pair of wheels supporting said frame;
    a load bed on said frame;
    means for swinging said weels relative to said frame to lower said load bed from a generally horizontal position to an inclined module-receiving position;
    a module-lifting fork pivotally mounted at an end of said load bed for lifting a module from the ground onto said load bed in its module-receiving position;
    a rotary shredder journalled on said frame proximate to an end of said load bed opposite to the end supporting said fork;
    a conveyor on said load bed for moving a module toward said shredder for progessive shredding thereby;
    drive means powered from the tractor for driving said shredder and said conveyor;
    and control means operative in response to variations in the torque on said shredder for inversely varying the drive speed of said conveyor.

3. The subject matter of claim 2, wherein said drive means includes a mechanical drive to said shredder and a hydraulic drive to said conveyor, said control means being operatively connected between said mechanical drive and said hydraulic drive.

4. The subject matter of claim 2, wherein said drive means includes a speed-controllable hydraulic motor for driving said conveyor, said drive means further including an endless element for transmitting drive to said shredder, said control means including means engageable with said endless element for sensing movement thereof induced by variations in torque on said shredder and transmitting speed changes to the hydraulic motor.

5. The subject matter of claim 2, including a discharge conveyor on said frame for feeding the shredded hay from the machine.

6. A machine for loading and shredding a module of hay, comprising:
   a mobile frame;
   a load bed mounted on said frame;
   means for tilting said load bed to enable a module to be loaded thereon;
   a plurality of rotary shredders journalled on said frame for shredding hay from the module;
   a conveyor on said load bed for moving a module toward said shredders for progressive shredding thereby;
   and power drive means for actuating said shredders and driving said conveyor, said power drive means including a control means for varying the drive speed to said conveyor in response to variations in the load imposed on said shredders, said power drive means including a mechanical drive to said shredders and a hydraulic drive to said conveyor, said control means being operatively connected between said mechanical drive and said hydraulic drive.

7. A machine for loading and shredding a module of hay, comprising:
   a mobile frame;
   a load bed on said frame;
   means for moving said load bed between an inclined load-receiving position and a generally horizontal position;
   means on said frame at one end for engaging and for lifting a hay module onto said load bed while in its inclined load-receiving position;
   power means for moving said load bed from its inclined position to its horizontal position automatically and sequentially in response to lifting said module onto said load bed;
   means on the frame for shredding the hay module on said load bed;
   and means on said bed for conveying the hay module from the lifting means to the shredding means.

* * * * *